(12) United States Patent
Patel

(10) Patent No.: US 9,581,504 B2
(45) Date of Patent: Feb. 28, 2017

(54) FREEZE, THAW AND REFREEZE INDICATORS BASED ON RAPID REACTIONS IN THE SOLID STATE

(75) Inventor: Gordhanbhai N. Patel, Middlesex, NJ (US)

(73) Assignee: J P Laboratories, Middlesex, NJ (US)

( * ) Notice: Subject to any disclaimer, the term of this patent is extended or adjusted under 35 U.S.C. 154(b) by 611 days.

(21) Appl. No.: 13/617,550

(22) Filed: Sep. 14, 2012

(65) Prior Publication Data
US 2013/0068155 A1 Mar. 21, 2013

Related U.S. Application Data

(60) Provisional application No. 61/536,009, filed on Sep. 18, 2011.

(51) Int. Cl.
G01K 3/04 (2006.01)
(52) U.S. Cl.
CPC ..................................... *G01K 3/04* (2013.01)
(58) Field of Classification Search
CPC ...... G01N 31/229; G01N 21/78; G01N 33/22; G01N 33/229; G01K 3/04; G01K 11/12
USPC ......... 116/206, 207, 216; 252/962; 374/106, 374/162; 436/164
See application file for complete search history.

(56) References Cited

U.S. PATENT DOCUMENTS

| | | | | |
|---|---|---|---|---|
| 2,715,103 | A * | 8/1955 | Nelson | C07C 7/20 252/1 |
| 3,272,434 | A * | 9/1966 | Zettlemoyer | A01G 15/00 239/14.1 |
| 4,735,745 | A * | 4/1988 | Preziosi | G01N 31/229 116/207 |
| 6,544,925 | B1 * | 4/2003 | Prusik | B32B 7/06 374/E3.004 |
| 2001/0046451 | A1 * | 11/2001 | Patel | G01N 31/229 422/424 |
| 2009/0218247 | A1 * | 9/2009 | Kalfon | B65D 33/04 206/459.1 |

OTHER PUBLICATIONS

Non-Patent Literature "CAMEO Chemicals—Chemical Datasheet—Sodium Nitrate Solution", archived on Aug. 27, 2009, accessed at http://web.archive.org/web/20090827085745/http://cameochemicals.noaa.gov/chemical/12642.*
Non-Patent Literature "Cocrystallization and Copolymerization of Diacetylenes: Some Novel Observations", G. G. Miller and G. N. Patel, Polymer Journal, vol. 13, No. 12, pp. 1075-1083 (1981).*

* cited by examiner

*Primary Examiner* — Laura Martin
*Assistant Examiner* — Irving A Campbell
(74) *Attorney, Agent, or Firm* — Barbara V. Maurer

(57) ABSTRACT

A freeze indicator, which is preferably a self-activating freeze indicator. The freeze indicator has a substrate with a freeze indicator composition coated thereon wherein the freeze indicator has a liquid diacetylene; and a catalyst or catalyst precursor and a protective cover.

39 Claims, 5 Drawing Sheets

FREEZE, THAW AND REFREEZE INDICATORS BASED ON RAPID REACTIONS IN THE SOLID STATE

CROSS-REFERENCE TO RELATED APPLICATIONS

The present application claims priority to U.S. Provisional Patent Application No. 61/536,009 filed Sep. 18, 2011 which is incorporated herein by reference.

BACKGROUND

The present invention relates to freeze indicators, thaw indicators and thaw/refreeze indicators based on rapid reactions in the solid state. More specifically, the present invention is related to a freeze indicator based on diacetylenes that can monitor and indicating freezing, thawing and if a material has been thawed and refrozen.

Many perishables, such as sera and vaccines get spoiled, deteriorate or lose quality if they suffer even a brief exposure to a temperature near or below freezing. Many types of produce, such as bananas, turn brown and become mushy. Some flowers, salad greens and herbs, wilt or shrink and become dark colored, useless and/or unappealing when exposed to freezing or near-freezing temperatures.

Biological products, such as vaccines, when used in hot climates, are commonly protected from excessive temperature exposure by keeping them in portable cold storage containers using blue ice or equivalent measures. However, such measures run the risk of causing freeze-related damage to vaccine samples in the vials or syringes from the cold ambient temperatures. Deterioration of vaccines, such as Hepatitis B vaccine is one example.

Though people feel cold temperatures it is difficult to determine when the skin or body part has had frost bite. An early warning indicator or coating can help eliminate frostbite and adverse conditions caused by exposure to cold temperatures.

Other examples where cooling beyond the freezing point has a detrimental effect include foods such as mayonnaise, fabric softeners, latex products such as paints, concrete modifiers and laboratory supplies. Biological samples such as whole blood, insulin and the like can be seriously affected when subjected to freezing conditions, and this is also true for high value biotechnology drugs containing proteins, enzymes or peptides. Therefore, it is important to the seller, buyer and end user of such products that some indicator be provided which will signal cooling conditions which could trigger a change in certain products.

A variety of freeze indicators are developed or proposed. For example, Hanlon et al. U.S. Pat. No. 4,148,748 proposes a freeze indicator which includes a means for detecting a freeze/thaw cycle by the encapsulation of an opaque colloidal dispersion of organic solid particles, such as latexes, suspended in a liquid medium. After having been frozen and thawed the suspension coagulates to form a non-flowing waxy gel leaving a clear liquid. The organic colloidal dispersion has no inherent color and appears as a white opaque cloudy liquid. Therefore, it presents serious problems in observing a change in state due to a freeze/thaw cycle.

Johnson in U.S. Pat. No. 4,191,125 discloses a freeze indicator composed of a frangible ampoule substantially filled with a mixture of water, a nucleating agent and a surfactant. Upon reaching the freezing point of water, the water mixture freezes fracturing the frangible ampoule.

Johnson in U.S. Pat. No. 4,646,066 discloses an indicator device employing a tuned electrical circuit interrogatable by an RF signal in the microwave range, or lower, based on the rupturing of saline-containing microcapsules or de-emulsification of liquids.

Emslander et al. in U.S. Pat. No. 4,846,095 disclose a freezing point indicating device comprising a microporous sheet which is wetted by a freeze-sensitive mixture of at least two liquids such as a water/butanol mixture. When the temperature of the liquid mixture reaches a critical value, such as the freezing point of water, the optical properties of the microporous sheet change.

Ignacio et al. in U.S. Pat. No. 5,239,942 disclose a freeze indicator comprising a frangible ampoule which is rupturable to release a dye that provides a color change.

Pereyra in U.S. Pat. No. 5,964,181 discloses a critical temperature indicating device employing an indicating composition which includes an organic compound that has a freezing point above the critical temperature; a compound that has a freezing point below the critical temperature; and a wetting component that can wet out a microporous membrane at about the critical temperature upon solidification of a portion of the composition.

Shahinpoor in U.S. Pat. No. 6,837,620 discloses a shape memory alloy temperature sensor having an alloy element that changes shape when exposed, even temporarily, to temperatures below a particular start temperature to provide a persistent indication of the temperature exposure.

U.S. Pat. No. 6,957,623 discloses a means for detecting a freeze/thaw cycle by the encapsulation of a mixture of water, a nucleating agent, latex, and stabilizers which is translucent prior to freezing and opaque after thawing.

Guisinger in U.S. Pat. No. 6,957,623 describes a critical temperature indicator which produces a visual, irreversible indication that the indicator has been exposed to a critical temperature, such as a temperature near the freezing point of water. The device includes a transparent housing and a temperature sensitive transformable material contained within the transparent housing. The transformable material includes a mixture of water, a nucleating agent, latex, and a stabilizer for the nucleating agent.

Taylor at el. in U.S. Pat. No. 7,343,872 disclose a freeze indicator which employs, an active indicator element, a dispersion of solid particles in a liquid medium which can be water or aqueous and which coagulates to provide an irreversible appearance change when subject to freezing. The active indicator element can be a dilute colloidal dispersion of a metal, such as gold or silver or other inorganic pigment material in water or an aqueous medium.

Taylor et al. in U.S. Pat. No. 7,571,695 disclose freeze indicators employing colloidal dispersions as active elements and include flexible freeze indicators, freeze indicators protected against drying out and freeze indicators employing core shell composites, for example gold coated pigments as active indicator elements. Also disclosed are: a combination freeze indicator and threshold temperature indicator; a combination threshold indicator and cumulative temperature indicator; and three-way combination indicators that can provide indications of cumulative past temperature exposure, exposure to freezing temperatures and exposure to a temperature above a threshold.

Taylor et al. in U.S. Pat. No. 7,624,698 describe a freeze indicator which employ an active indicator element, dispersion of solid particles in a liquid medium which can aqueous and which coagulates to provide an irreversible appearance change when subject to freezing.

Kagan et al. in U.S. Application Patent No. 20100020846 disclose a temperature-threshold indicator device comprising a sealed housing containing a suspension of inorganic nanoparticles suspended in a liquid medium wherein the suspension undergoes an irreversible detectable change in optical characteristics upon freezing of the liquid medium due to aggregation of the nanoparticles.

Randall and Yeager in U.S. Patent Application No. 20100264640 disclose a device for obscuring printed indicia which includes a printable substrate, an indicia printed on a first surface of the substrate, an irreversible thermochromic material operably associated with the printable substrate which does not affect readability of the indicia when not subjected to a predetermined critical temperature and when subjected to the predetermined critical temperature renders the indicia unreadable by virtue of a color change surrounding the indicia.

Palin and Cimbalova in U.S. Patent Application Nos. 20090211268 and 20090139250 disclose a defrost indicator configured such that the process of freezing and defrosting the defrost indicator places the defrost indicator into a state that is not completely reversed by refreezing, so that one can detect whether the defrost indicator defrosted and refroze or never defrosted by observing its current state.

Other representative patents on freeze-thaw type indicators include U.S. Pat. Nos. 3,615,719; 4,114,443; 4,145,918; 4,148,748; 4,191,125; 5,111,768 and 5,239,942.

Preziosi et al. in U.S. Pat. No. 4,892,677 disclose a process for monitoring the time-temperature history of perishable items. The process initially involves forming a solution comprising diacetylenic monomer and a solvent. The solution is frozen and the frozen solution having crystalline diacetylenic monomer therein is irradiated to partially polymerize the diacetylenic monomer. Irradiation is required because diacetylenes polymerize very slowly, often days and months for development of a faint color at lower temperatures, such as 0° C. Due to the intensity of the color of the polydiacetylene formed upon radiation, the entire article of manufacture appears to be colored. Upon exposure to temperatures above a critical temperature, the frozen solvent melts and extracts unreacted monomer from the colored polymer, thereby causing a sharp color transition which indicates that the perishable should possibly be discarded. U.S. Pat. Nos. 4,735,745; 5,685,641 and 5,695,284 also utilize a diacetylene as an indicator. This type of indicator undergoes a color change when the product temperature undesirably exceeds about 0° C., i.e., thawing. The device of Preziosi et al. is unidirectional, meaning it is capable of providing a signal with an increase in temperature. These devices monitor thawing only and not freezing. As the frozen solution of diacetylene does not develop color rapidly, the devices proposed by Preziosi et al. require radiation for polymerization of diacetylenes to color polymer which is undesirable.

Patel in U.S. Pat. No. 6,472,214 discloses a device composed of a color changing indicator, an optional polymeric binder that can have gel-forming capability, and a solvent mixture which induces a color change in the indicator when the device is frozen, in the region of about 0 to −30° C. The color-changing indicator can be a fine dispersion of a diacetylene partially polymerized by radiation, dispersed in the solvent mixture. When the temperature of the device is lowered to the freezing point of water, an activator solvent phase separates out of the solvent mixture and induces a color change in the indicator. The device proposed by Patel also requires radiation to produce color.

Most of the prior art devices are large, complex, difficult to manufacture, expensive with a cost of up to $1 US per device, use fluids, require activation such as with UV light, use glass, have a short shelf life, do not show how long an item has been frozen, do not display color change while frozen, and none of them are self-reading. None of the prior art devices are capable of monitoring freezing, thawing and re-freezing.

The freeze indicators reported in the literature only indicate freezing and do not show how long an item has been frozen. Hence, there is a need for an indicator which shows the extent or duration of freezing. The freeze indicators reported in the literature only indicate freezing and do not indicate thawing and refreezing. Hence, there is also a need for an indicator which shows the extent of freezing and indicates thawing followed by re-freezing.

There is a need for freeze and thaw indicators which are simple, easy to make, do not require external means of activation such as radiation with UV light, which are self-activating, self-reading, which also monitor thawing and refreezing, which do not have a low viscosity fluid and are economical for commercial production.

SUMMARY

It is an object of the invention is to provide a self-activating, self-indicating and/or self-reading freeze indicator.

It is another object of the invention is to provide a self-activating, self-indicating and/or self-reading thaw indicator.

It is another object of the invention is to provide a self-activating, self-indicating and/or self-reading freeze and thaw indicator.

It is another object of the invention is to provide a monitor which indicates re-freezing of thawed frozen products.

It is another object of the invention to provide a freeze indicator which initiates and accelerates solid state polymerization of diacetylenes with a catalyst or an initiator at low temperatures.

It is another object of the invention to provide a freeze indicator with accelerated solid state polymerization of diacetylenes using a catalyst or its initiator which has the ability to complex or react with diacetylenes.

It is another object of the invention to provide a freeze indicator which generates a catalyst, preferably in-situ, for polymerization of a diacetylene by decomposition of a precursor for the catalyst.

It is another object of the invention to provide a freeze indicator which accelerates solid state polymerization by co-crystallizable diacetylenes with or without a catalyst or initiator at low temperatures.

It is another object of the invention to provide a freeze indicator with accelerated solid state polymerization of diacetylenes which forms a noticeable color within minutes with a catalyst or initiator at low temperatures.

It is another object of the invention to provide a freeze indicator with an accelerated polymerization of diacetylenes with a catalyst which is a strong oxidant, a Lewis acid, a peroxide, organo-metallic compounds, or nano-particles.

It is another object of the invention to provide a freeze indicator with an accelerated solid state polymerization of diacetylenes by co-crystallization and/or with a catalyst or initiator at temperatures below 25° C., more preferably below 4° C. and even more preferably below 0° C.

It is another object of the invention to provide a freeze indicator which uses water soluble diacetylenes for freeze and thaw indicators.

It is another object of the invention to provide a freeze indicator to use water soluble diacetylenes for freeze and thaw indicators, where the side group is water soluble functionality, such as an acid, salt of acid, ether, amine, amide or similar water soluble functionality.

It is another object of the invention to provide a freeze indicator which uses a mixture of a diacetylene, a solvent and a catalyst for polymerization of the diacetylene for freeze and thaw indicators.

It is another object of the invention to provide a freeze indicator using a diacetylene having a low crystallization or melting point such as below 4° C.

It is another object of the invention to provide a freeze indicator wherein the crystallization or melting point of diacetylenes is adjusted with an additive such as with a solvent.

It is another object of the invention to provide a freeze indicator which uses additives and/or solvents which become solid at a desired freezing point and which let diacetylenes crystallize.

It is another object of the invention to provide a freeze indicator wherein an additive changes the melting or freezing of the indicating formulation to vary the temperature required for the freeze and/or thaw.

It is another object of the invention to provide a freeze indicator using diacetylenes which develop blue or red color upon freezing their solution or melt, with or without a catalyst or its pre-cursor.

It is another object of the invention to provide a freeze indicator wherein solid state polymerization of diacetylenes is accelerated to polymerize or partially polymerize to a blue color at low temperatures.

It is another object of the invention to provide a freeze indicator wherein solid state polymerization of diacetylenes, which polymerize or partially polymerize to a colored material at low temperatures, is accelerated and the color changes to another color when heated above the freezing point where the color change is accelerated.

It is another object of the invention to provide a freeze indicator wherein solid state polymerization of diacetylenes, which polymerize or partially polymerize to a blue color at low temperatures and changes to red color when heated above the freezing point, is accelerated.

It is another object of the invention to provide a freeze indicator wherein solid state polymerization of diacetylenes, which polymerize or partially polymerize to a red colored at low temperatures and changes to blue or black color when heated above the freezing point, is accelerated.

It is another object of the invention to provide a thaw indicator which is essentially unaffected under ambient storage and shipping conditions, rapidly develops a color when frozen and changes to another color when thawed.

It is another object of the invention to provide a thaw indicator which rapidly develops a blue color when frozen and changes to a red when thawed wherein the color change is accelerated.

It is another object of the invention to provide a thaw indicator which rapidly develops a red color when frozen and changes to a blue or black when thawed.

It is another object of the invention to provide a refreeze indicator which develops a different color or a mixture of freeze and thaw colors upon re-freezing.

It is another object of the invention to provide an indicator wherein the time required for a noticeable color change of the freeze and thaw indicators varies from less than a minute to days.

It is another object of the invention to provide a freeze-thaw indicator wherein the time required for a noticeable color change of the freeze and thaw indicators can be varied from a minute to a few hours.

It is another object of the invention to provide a freeze-thaw indicator wherein the temperature required for a noticeable color change of the freeze and thaw indicators varies from −40° C. to 100° C.

It is another object of the invention to provide a freeze, freeze-thaw and/or freeze-thaw-refreeze indicating mixture or a formulation composed of a diacetylene, a catalyst and/or a co-catalyst or an accelerator, a promoter, precursor for a catalyst, a solvent and/or a binder.

It is another object of the invention to provide a freeze, freeze-thaw and/or refreeze indicating mixture or a formulation of co-crystallized two or more diacetylenes, a catalyst and/or co-catalyst or an accelerator, a promoter, a precursor for the catalyst, a solvent and/or a binder.

It is another object of the invention to provide a freeze, thaw, refreeze, freeze-thaw, and/or freeze-thaw-refreeze indicating formulation on a substrate.

It is another object of the invention to provide a sandwich comprising a freeze, thaw, refreeze, freeze-thaw, and/or freeze-thaw-refreeze indicating formulation between two films, one being transparent.

It is another object of the invention to provide a sandwich comprising a freeze, thaw, refreeze, freeze-thaw, and/or freeze-thaw-refreeze indicating formulation sealed between two films, one being transparent.

It is another object of the invention to provide a freeze, thaw, refreeze, freeze-thaw, and/or freeze-thaw-refreeze indicator wherein the freeze indicating formulation is printed in the form of a message.

It is another object of the invention to provide a freeze, thaw, refreeze, freeze-thaw, and/or freeze-thaw-refreeze indicator wherein the indicating formulation is printed in the form of a message and sealed between two films with at least one film being transparent.

It is another object of the invention to provide a sandwich of freeze and/or freeze-thaw indicating formulation between two impermeable films with at least one being transparent.

It is another object of the invention to provide are processes of making formulations and devices which change color when frozen, thawed and/or refrozen.

It is another object of the invention to provide a process of applying freeze and/or freeze-thaw indicating devices on an object, preferably, which is sensitive to freeze, thaw and/or refreeze.

It is another object of the invention to provide methods of making freeze and thaw indicating devices by coating the color changing formulation and sandwiching them between two films.

It is another object of the invention to provide a device for indicating freeze, thaw, refreeze, high temperature, and/or time-temperature.

It is another object of the invention to provide a device for indicating freeze, thaw and high temperature.

It is another object of the invention to provide a device for indicating freeze and time-temperature.

It is another object of the invention to provide a device for indicating thaw and time-temperature.

It is another object of the invention to provide a device for indicating freeze, thaw, high temperature and time-temperature.

It is another object of the invention to provide a process of making freeze, thaw, refreeze, freeze-thaw, and/or freeze-thaw-refreeze indicator devices.

It is another object of the invention to provide a process of making freeze, thaw, refreeze, freeze-thaw, and/or freeze-thaw-refreeze indicator devices on the same substrate.

These and other embodiments, as will be realized, are provided in an improved freeze indicator, which is preferably a self-indicating freeze indicator. The freeze indicator has a substrate with a freeze indicator composition coated thereon wherein the freeze indicator has a liquid diacetylene; and a catalyst or catalyst precursor.

Yet another embodiment is provided in a process for monitoring freezing and thawing of a perishable product. The process includes:
placing an indicator on the perishable product wherein the indicator has:
a support with an indicator composition on the support wherein the indicator solution has;
a liquid or solution of diacetylene; and
a catalyst or catalyst precursor;
monitoring the indicator to determine thermal exposure of the perishable product wherein:
a colorless indictor indicates no exposure to a temperature below a freezing temperature;
a first color indictor indicates exposure to a temperature below the freezing temperature; and
a second color indicator indicates exposure to a temperature below the freezing temperature followed by subsequent exposure to a temperature above the freezing temperature.

Yet another embodiment is provided in a system for monitoring a perishable product. The system has an indicator which is placed on the perishable product. The indicator has a support with an indicator composition on the support wherein the indicator solution has a liquid or solution of diacetylene and a catalyst or catalyst precursor. The indicator solution is colorless prior to excursion below a freezing temperature. When the perishable product is subjected to a temperature below freezing temperature a first portion of liquid diacetylene becomes solid and changes to a first color. After excursion below the freezing temperature when the perishable product returns to a second temperature above the freezing a second portion of solid diacetylene becomes liquid diacetylene and changes to a second color. After returning to the second temperature when the perishable product is cooled to below the freezing temperature a third portion of liquid diacetylene turns the first color.

BRIEF DESCRIPTION

The present invention is related to an indicator capable of indicating freezing, thawing and thaw/refreeze. More specifically, the present invention is related to an indicator utilizing diacetylene and additives for altering the reactivity of the diacetylene thereby allowing the reaction period to be adjusted to a desire reaction time or temperature range.

The invention will be described with reference to the figures which form an integral, non-limiting component of the disclosure. Throughout the disclosure similar elements will be numbered accordingly.

When a liquid mixture of a diacetylene (R—C≡C—C≡C—R, where R is substituent group) and a catalyst for its polymerization is frozen, it undergoes a rapid and irreversible color change, for example, from colorless to a blue colored partially polymerized diacetylene and when subsequently thawed, it changes from blue-to-red. If re-frozen, it develops purple color. The device can be used for monitoring (1) freezing of freeze sensitive products, such as vaccines and fresh produce, (2) thawing of frozen foods and (3) re-freezing of them.

Figure 1:
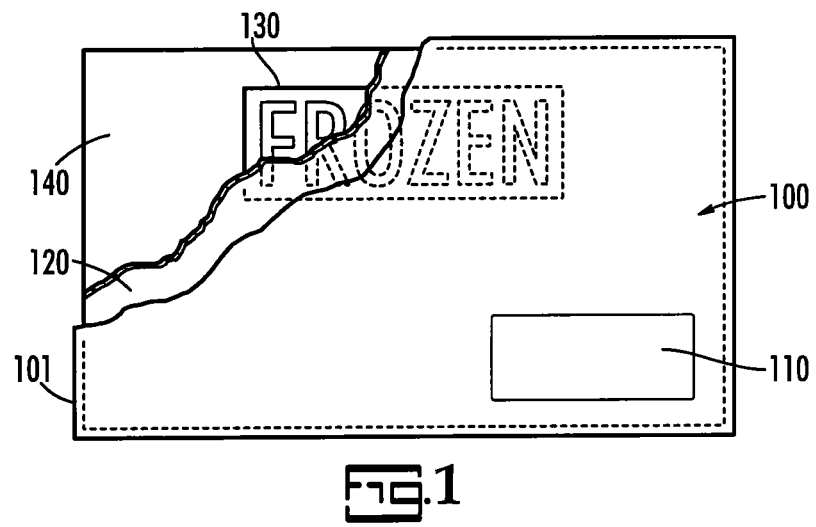
FIG. 1 is a schematic representation of a top view of an embodiment of the invention.
Figure 2:
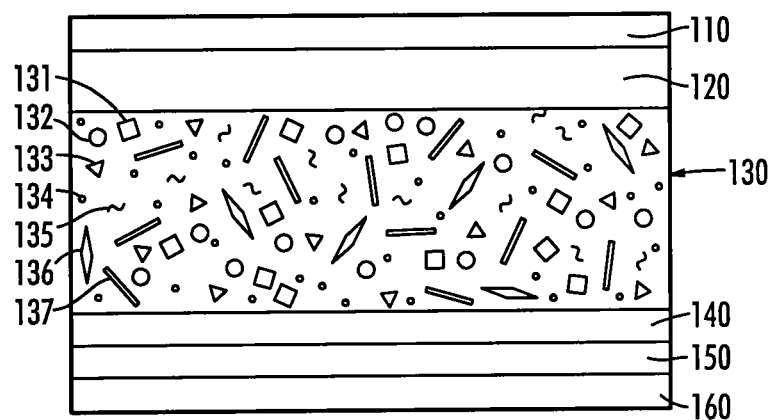
FIG. 2 is a schematic representation of a partial cross-sectional view of an embodiment of the invention.

An embodiment of the invention is illustrated in schematic top view in FIG. 1 and in schematic cross sectional in FIG. 2. In FIGS. 1 and 2 a freeze indicating device 100 is illustrated. The freeze indicating formulation 130 can be coated on a substrate 140 which can be white and opaque and the formulation is protected with a transparent barrier layer or film 120. If the freeze indicating formulation is a gel or fluid, substrate 140 and a barrier film 120 can be sealed 101 from all sides to form a pouch. The pouch for the formulation can be made by sealing either two layers of a substrate alone or barrier film alone. The top barrier film may have a protective coat and/or a message, instruction or information, 110. As an example the image may have a statement such as "If this area is blue, the container may be frozen. Do not use" printed on it. The substrate 140 may have an adhesive layer 150 such as a pressure sensitive adhesive (PSA) and a release liner 160 for applying onto a container or a label. The device could be flat, domed or like a bubble.

The embodiments illustrated in FIGS. 1 and 2 represent self-reading indicators wherein the image is an image which is indicative of the state of the indicator such as a word, symbol, message and the like which indicates a condition such as frozen, thawed, refrozen etc. A self-reading indicator can also have a color which represents a condition such as blue for frozen, red for thawed or the combination of blue and red, or purple, to indicate frozen, thawed and refrozen. A self-activating sensor is defined herein as a sensor which does not require pre-treatment such as UV exposure to be active.

The freeze indicating formulation 130 can be in form of an ink or paint which can be coated on a substrate. It can also be in form gel or viscous liquid. The formulation 130 can be composed of an indicating compound, such as one or more diacetylenes 131, nucleating agent 132, a solvent or a liquid medium 133, a catalyst 134 for polymerization of diacetylenes, a precursor 135 for the catalyst, a promoter 136 for the catalyst and a polymeric binder 137.

Figure 3:
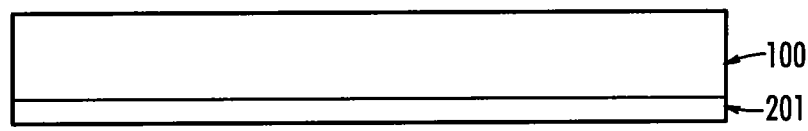
FIG. 3 is a schematic cross sectional view of an embodiment of the invention.
Figure 4:
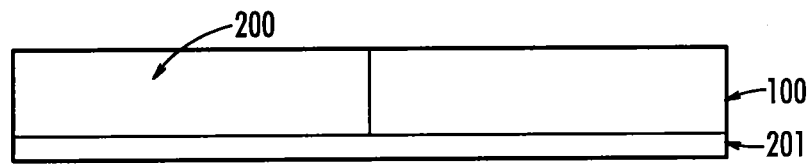
FIG. 4 is a schematic cross sectional view of an embodiment of the invention.
Figure 5:
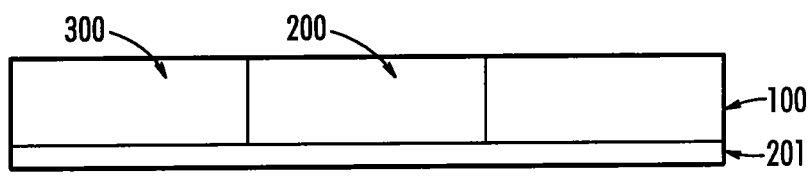
FIG. 5 is a schematic cross sectional view of an embodiment of the invention.

Certain perishables, such as vaccines and fresh blood, often need more than one indicator for monitoring their quality, e.g., two indicators, such as a freeze and a thaw, a freeze and a time-temperature, a freeze and a high temperature, or three such as a freeze, a time-temperature and a high temperature indicators. FIG. 3 shows a schematic presentation of one indicator such as a freeze indicator 100 on a substrate 201. FIG. 4 illustrates two indicators such as a freeze 100 and a time-temperature 200 on a substrate 201. FIG. 5 illustrates three indicators such as a freeze 100, a time-temperature 200 and a high temperature 300 on one side of a common substrate 201, which can be a container or a label for the perishable.

Figure 6:
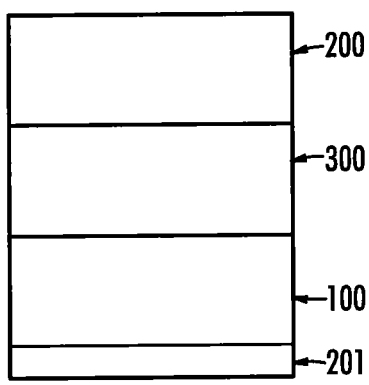
FIG. 6 is a schematic cross sectional view of an embodiment of the invention.
Figure 7:
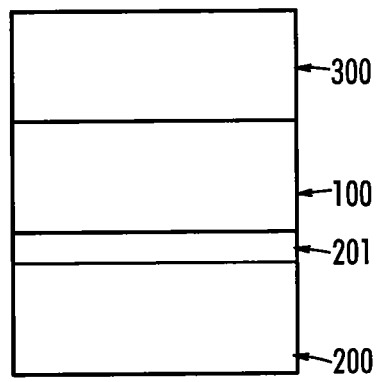
FIG. 7 is a schematic representation of an embodiment of the invention.

The freeze 100, time-temperature 200 and temperature 300 indicators can also be stacked on one side of the substrate 201 as shown in FIG. 6 or indicators can be on both the sides as shown schematically in FIG. 7. An indicator can be printed or coated on the other indicator. An indicator can be inside the other as well.

Figure 8:
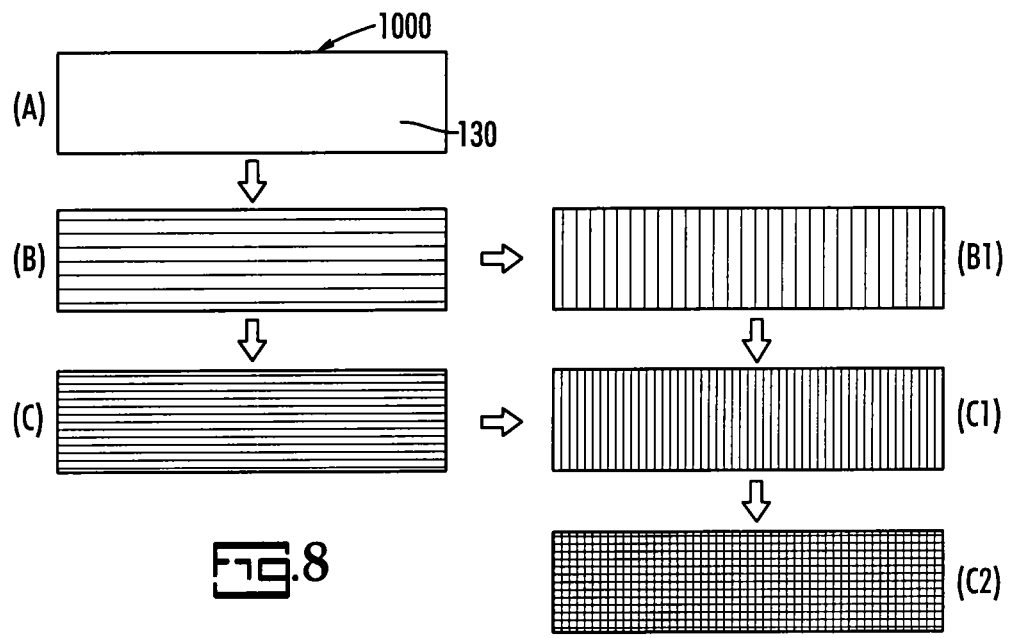
FIG. 8 is a schematic representation of an embodiment of the invention.

Color development and color intensification of a freeze indicator 1000 with time of freezing and thawing are shown schematically in FIG. 8. The freeze indicator formulation 130 based on polymerization of diacetylenes before freezing can be colorless or faint colored as shown in FIG. 8(A). Diacetylenes do not polymerize in solution or molten state and hence the indicator will remain colorless until frozen. Upon freezing the device, the diacetylenes will crystallize and start polymerizing, especially rapidly in the presence of a catalyst to a colored material, such as a blue or red colored polymer, which is a polydiacetylene, as illustrated in FIG. 8(B), thereby indicating freezing. More polydiacetylene chains will be formed with prolonged freezing and the color will intensify. The degree of polymerization will increase with freezing time and the color such as blue will become darker as illustrated in FIG. 8(C). Thus, the device can indicate how long the indicator and the perishable it is applied on, are frozen. The rate of polymerization and hence the color development will depend upon many factors, such as nature and concentration of diacetylene, cocrystallized diacetylenes, nature and concentration of catalyst(s), co-catalyst, promoter, precursor(s), solvent, nucleating agent and binder. If the device is thawed, it may change color such as from light blue-to-light red as illustrated in FIG. 8(B1) or dark blue-to-dark red as illustrated in FIG. 8(C1). If the device is refrozen, it will appear purple as illustrated in FIG. 8(C2) due to polymerization of diacetylene upon refreezing and the red color formed due to thawing of the previously formed polydiacetylene chains.

Thus, the freeze indicating device based on polymerization of diacetylenes can monitor freezing, how long it has been frozen, thawing and refrozing.

Figure 9:
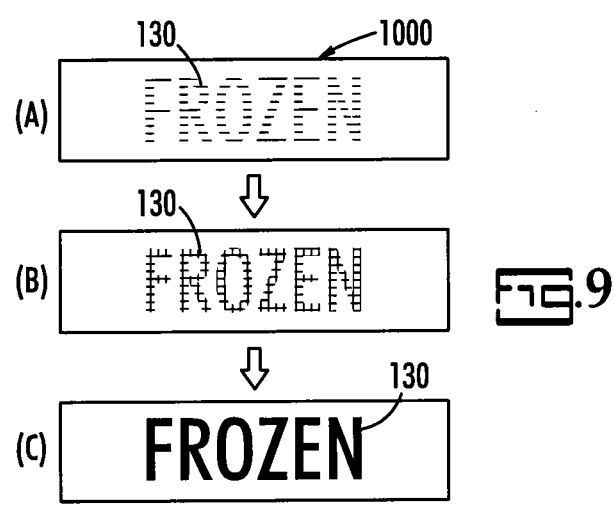
FIG. 9 is a schematic representation of an embodiment of the invention.

An embodiment of the invention is illustrated in schematic view in FIG. 9. In FIG. 9, if the freeze indicating formulation, 130 of the freeze indicator is printed in form of a message, such as FROZEN, thereby providing a self-reading freeze indicator 1000. The printed message, such as FROZEN, cannot be seen till the device is frozen. Upon freezing the device, the message will appear as light blue colored as shown in FIG. 9(B). With prolonged freezing, the message will become darker as shown in FIGS. 9(C). The devices having continuous coating of freeze indicating formulation 130, can also be made self-reading by having a clear window in the form of a message on an opaque top barrier film 120. If the device is thawed, the word FROZEN may change from blue-to-red depending upon how long it has been frozen. If the device is refrozen, the message will appear purple. The message can be printed in any form or symbol.

There is a need for multi-sensor indicators for many perishables. For example, certain vaccines and fresh blood cannot be frozen and at the same time they cannot be heated above certain temperatures. Many perishables also have a relatively shorter shelf life even under refrigeration and hence they expire after a certain time and temperature of storage. Hence, many perishables need freeze and temperature (often referred as high temperature indicator or high threshold temperature) indicators and/or they need freeze and time temperature indicators.

Figure 10:
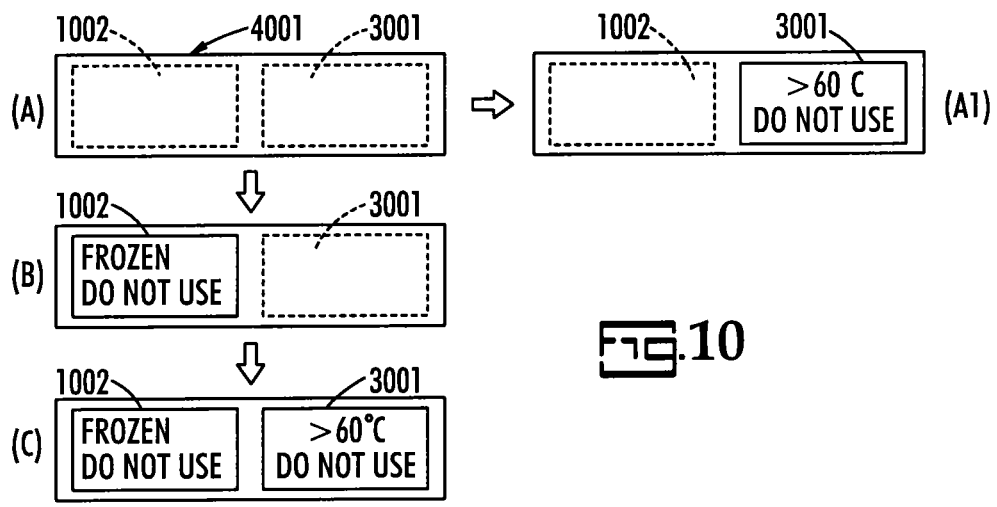
FIG. 10 is a schematic representation of an embodiment of the invention.

An embodiment of the invention is illustrated in schematic view in FIG. 10. FIG. 10 illustrates a dual indicating system 4001 composed of freeze indicator 1002 and temperature indicator 3001 which can be created by printing a thermochromic formulation such as a leuco dye or by applying a temperature indicating device on a freeze indicating device or vice versa. The freeze indicating device can be color changing or self-reading. The temperature indicating device can also be color changing or self-reading as shown in FIG. 10(A). If the device is heated above the threshold temperature, for example 60° C., a message can appear, such as ">60° C., DO NOT USE" as shown in FIG. 10(A1). If such device is frozen, a message such as "FROZEN, DO NOT USE" can appear as shown in FIG. 10(B). The color of the message will become darker with prolonged freezing. If the frozen device is heated above the threshold temperature both the messages will appear as shown in FIG. 10(C). Instead of shelf-reading the sensors can be color changing if the indicating formulations are continuous coatings. One of the sensors can be self-reading and the other color changing.

Figure 11:
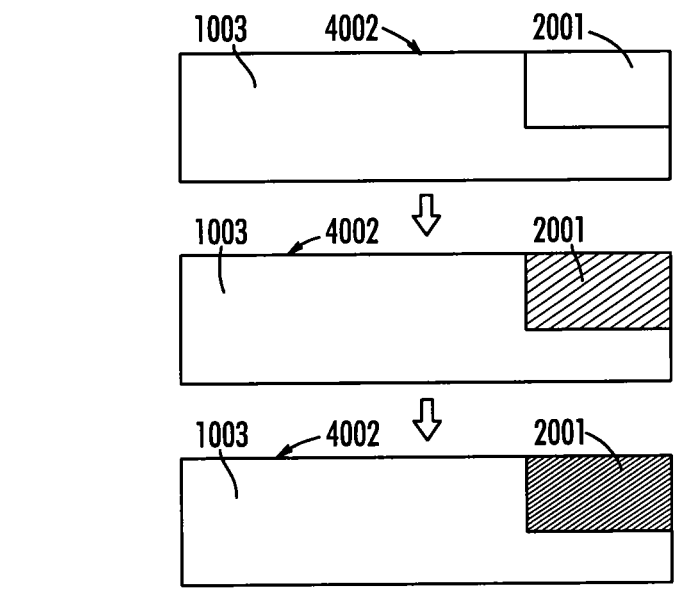
FIG. 11 is a schematic representation of an embodiment of the invention.

An embodiment of the invention is illustrated in schematic view in FIG. 11. FIG. 11 illustrates a dual indicating system 4002, freeze indicator 1003 and time-temperature indicating system 2001 which can be created by printing a time-temperature indicator formulation or by applying a time-temperature indicating device on a freeze indicating device or vice versa. The freeze indicating device 1003 can be color changing or self-reading and the time temperature indicator device can also be color changing or self reading. If the device is not frozen the time-temperature indicating system does not have a color but the color gets progressively darker as the time below freezing increases.

Figure 12:
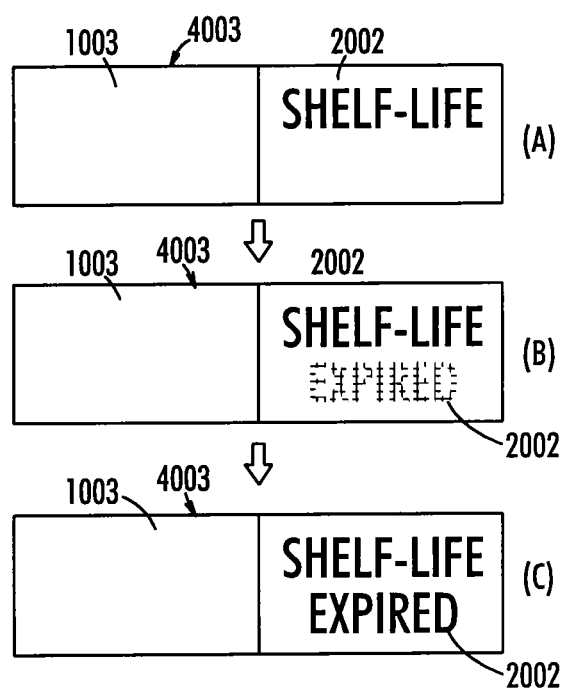
FIG. 12 is a schematic representation of an embodiment of the invention.

An embodiment of the invention is illustrated in schematic view in FIG. 12. In FIG. 12 a freeze indicating device 1003 with a color changing time temperature indicator and with a self-reading time temperature indicator 2002 is illustrated. If the device is not frozen, the freeze indicator 1003 will not appear. The time-temperature may have a color reference bar to indicate expiration of the shelf life. Once a sufficient time at temperature has been achieved the time temperature indicator begins to appear as evidenced by the time temperature indicator message printed in the form of the word "expired" even though the product was not frozen as indicated by the lack of an indication in the freeze indicator.

The proposed multi-sensor devices of FIGS. 10, 11 and 12 can be on the same side of a substrate, one above and the other below, one above the other or one inside the other.

The devices may have a pressure sensitive adhesive layer for applying onto an object such as a perishable.

The color changing devices may have a color reference bar to determine conditions for use or reject.

The devices may have printed instructions and directions for use.

If a perishable has a freeze indicator and a color changing time temperature indicator 2001 and if it is not frozen, expiration of the shelf life of the perishable can be indicated by the color changing time temperature indicator 2001 as shown in FIGS. 11(B) and 11(C). The time temperature indicator may have a color reference bar for determination of expiration of the shelf life.

A dual indicating system 4003, frozen 1003 and self reading time-temperature indicating system 2002 is shown in FIG. 12. If a perishable has a freeze indicator 1003 and a self-reading time temperature indicator 2002 and if the perishable is not frozen, expiration of the shelf life of the perishable can be indicated by the appearance of the message as shown in FIGS. 12B and 12C.

The term instant, rapid or fast is used for time e.g., from seconds to hours during which a noticeable or measurable change occurs such as solid state polymerization of diacetylene and development of noticeable a color or can be measured with an instrument or analytical method.

Diacetylenes, R'—C≡C—C≡C—R", where R' and R" are substituent groups, often referred herein as side group or "R" group polymerize only in the solid state. R' and R" can be the same or different. Diacetylenes polymerize to a colored polymer either upon exposure to high energy ionizing radiation or upon thermal annealing. Polymerization of diacetylenes with radiation, such as short wavelength UV light is very fast but upon thermal annealing is usually very slow. In order to minimize color development, diacetylenes are typically stored in a refrigerator or freezer. Polymerization of a diacetylene to a noticeable blue color in minutes at low temperatures such as at 0° C. in the absence of ionization radiation is not reported.

Diacetylenes polymerize only in the solid state and do not polymerize in solution or liquid/molten states. Some diacetylenes are liquids above 0° C. or above −30° C. Many diacetylenes develop color during their synthesis and purification. The liquid diacetylenes become solid upon freezing and polymerize to a blue or red color very slowly, such as days or months, at low temperatures. The polymerization of diacetylenes is usually so slow that they are kept in a freezer for weeks and months until used. We have found catalysts and precursors for catalysts for rapid polymerization of diacetylenes, especially at low temperatures.

The basic formulation for the proposed devices comprises a liquid diacetylene or co-crystallizable diacetylenes and a catalyst or its precursor for rapid polymerization of the diacetylene(s) when frozen. The formulation may contain a polymeric binder to add a body to the formulation and a solvent or an additive to adjust the temperature for freezing and/or thawing. The mixture may contain other additives, such as a promoter, a nucleating agent, a coloring agent, a UV absorber and a surfactant. The formulation does not polymerize above the freezing temperature and hence is essentially colorless. Upon freezing, the diacetylene(s) crystallizes and depending upon the nature of the catalyst and its concentration used, partially polymerizes to light blue or red color within seconds to minutes, thereby indicating freezing. The color intensifies with time of freezing as more diacetylene molecules polymerize with time. If the frozen sample is heated above the freezing point, the blue colored partially polymerized diacetylenes change irreversibly from blue-to-red thereby indicates thawing. The color change from blue-to-red is due to melting/dissolution/extraction of unreacted monomers. The red color is the color of free polydiacetylene molecules. Upon re-freezing, the melted/dissolved monomers will re-crystallize and develop blue color. As a result, the resultant mixture will appear blue plus red, i.e., purple/violet. Thus, one can also monitor re-freezing.

As the polymerization of the device is fast, it can also be used as a thaw indicator for frozen foods. The device or container having the device can be made, stored and shipped at any temperature above the freezing temperature without any color development. The devices can be applied on a frozen container. When the container is frozen or filled with frozen food, the device will develop a blue color. If the device or the container it is applied on is brought above the freezing temperature, the device will change to red color thereby indicating thawing.

It is known that polymerization of diacetylenes cannot be initiated with common catalyst or initiators, e.g., radical initiators, such as peroxides. However, Patel in U.S. Pat. No. 4,238,352 has shown that the solid state polymerization of diacetylenes can be accelerated by co-crystallization at high temperatures, e.g., above room temperature (Cocrystallization and Copolymerization of Diacetylenes: Some Novel Observations, G. G. Miller and G. N. Patel, Polymer Journal, Vol. 13 p1075 (1981)). However, rapid copolymerization of diacetylenes at low temperatures, e.g., below freezing is not reported.

As the polymerization reaction occurs in the solid state there are no known catalysts or initiators for rapid polymerization of diacetylenes. Patel tried many known catalysts, radical and carbene initiators, such as peroxides and reported that they are not very effective but he demonstrated that the thermal and radiation reactivities can be increased by one to three orders of magnitude by co-crystallization of two or more diacetylenes wherein one diacetylene functions as a catalyst for the other diacetylene (Cocrystallization and Copolymerization of Diacetylenes: Some Novel Observations, G. G. Miller and G. N. Patel, Polymer Journal, Vol. 13 p1075 (1981)).

It often takes hours and days for diacetylenes to develop noticeable color at room temperature and much longer, e.g., months at lower temperatures, such as below 0° C.

Patel et al. have demonstrated that polymerization of diacetylenes can be initiated with very reactive gases, such as chlorine and ozone ("The solid-state polymerization of diacetylenes by reactive gases: Initiation by chlorine", G. N. Patel et al, Journal of Polymer Science: Polymer Letters Edition, vol. 19, p511, 1981 and "Ozonolysis of a Polydiacetylene", Patel at el, J. Macromol. Sci.—Phys., vol. B22, p259, 1983).

Though the use of chlorine and ozone is known to initiate polymerization, they are gases and they are too strong reagents. Hence, they also react with polydiacetylene and destroy the color. It is difficult to use gases as catalysts for a small device. We have discovered that the complexes or precursors of reactive catalysts, such as chlorine, nitrogen oxide and ozone are very effective in initiation of polymerization of diacetylenes.

Many strong oxidants including a compound that readily transfers oxygen atoms or gains electrons in a redox reaction can be used as catalysts for the solid state polymerization of diacetylenes. Common oxidizing agents that have potential of initiating polymerization of diacetylenes include hydrogen peroxide and other inorganic peroxides, nitric acid and nitrates, nitrite, chlorite, chlorate, perchlorate and other analogous halogen compounds, hypochlorite and other hypohalite compounds, such as bleach, iodine and other halogens, ozone, nitrous oxide, silver oxide, permanganate salts, hexavalent chromium compounds, such as chromic and dichromic acids and chromium trioxide, pyridinium chlorochromate, and chromate/dichromate compounds, persulfuric acid, sulfoxides, sulfuric acid, Tollens' reagent, 2,2'-dipyridyldisulfide, osmium tetroxide, common oxidizing agents and their products oxygen, ozone and ozonides.

Another class of strong oxidants which can be used for initiation of polymerization of diacetylenes are nitrogen oxides, such as nitrous oxide ($N_2O$), nitric oxide (NO which is a stable free radical) and nitrogen dioxide ($NO_2$). The corresponding acids are nitrous acid ($HNO_2$) and nitric acid ($HNO_3$), with the corresponding salts, nitrite and nitrates, which can also be used as precursors of the catalysts for polymerization of diacetylenes. Other compounds which can be used are nitro cellulose and nitroglycerine with slightly lower than full nitration.

Other examples of nitrites that can be used as precursors are barium nitrite hydrate, butyl nitrite, ethyl nitrite, dicyclohexylamine nitrite, isobutyl nitrite and tetrabutylammonium nitrite.

Stable free radical or carbene compounds can also be used for initiating polymerization of diacetylenes.

The other classes of oxidants that can be used as the catalysts or their precursors are halogens and their complexes. They include calcium hypochlorite which can provide chlorine ($Cl_2$), sodium hypochlorite which can provide hypochlorite ($OCl^-$), or hypochlorous acid (HOCl). Solid chlorinated isocyanurates are particularly preferred such as dichloro isocyanuric acid, commercially available as dichlor, or trichlorocyanuric acid which is commercially available as trichor. Iodobenzene dichloride ($PhICl_2$) is a complex of iodobenzene with chlorine can also be used.

Another class of compounds that can be used as catalysts is chlorine dioxide, its salts and complexes.

Oxidants can be immobilized by reacting with a polymer, such as Amberlite® IRA 900 $NO_2^-$, which is commercially available as an ion exchange resin, can also be used.

Super acids and their salts can be used as a catalyst.

Nitrogen oxides and their complexes which can be suitable as the catalysts include nitrosyl sulfuric acid, nitrosonium tetrafluoroborate, nitrosonium hexafluorophosphate, nitrosonium hexachloroantimonate, nitrosonium halides, nitrosonium nitrate, nitrosonium phosphate, nitrosonium carboxylates, nitrosonium perchlorate, $NOPF_6$, NOPF, metal nitrosyls, nitrosyl halides, nitrosyl acetate, nitrosyl sulfate, nitrosyl sulfuric anhydride, nitrites and mixtures thereof.

Organic nitrites that can be used include amyl nitrite, nitroglycerine, butyl nitrite, isobutyl nitrite, ethyl nitrite, methyl nitrite, isopropyl nitrite and cyclohexyl nitrite.

Strong oxidants, such as halogens (e.g., chlorine), ozone, nitrogen oxide and their complexes or precursors are preferred catalyst.

A catalyst can be added in the formulation, can be encapsulated or emulsified so that they become available only when frozen as the capsules will rupture. Emulsified catalysts can also be used.

Nano particles are known to exhibit catalytic properties and they can also initiate polymerization of diacetylenes. Fine powder of metallic catalyst, such as silver, copper can be used.

Many chemicals, such as aldehydes, diaminesilver(I) hydroxide ($Ag(NH_3)_2OH$), organo metallic catalysts, such as n-butyl lithium and phenyl lithium can also be used for polymerization of diacetylenes.

Many salts of catalysts, such as chlorine and nitrogen oxides are not effective to initiate polymerization of diacetylenes in the solid state. An initiator or promoter can be used to produce the catalyst. For example, sodium nitrite does not initiate polymerization of diacetylenes but it can be decomposed to produce nitrous acid either by heating (may need a solvent like water) or by adding an acid, especially week acids, such as carboxylic acids, such as aliphatic and aromatic acids, such as acetic acid, lauric acid, palmitic acid, benzoic acid, phenols or polyphenols, such as catechol.

We tested a large number of organic and inorganic compounds to initiate solid state polymerization of two liquid diacetylenes, 1,10-dichloro-4,6-decadiyne (which develops red color upon polymerization at low temperature) and methyl-10, 12-tricosadiyanoate (which develops blue color upon polymerization at low temperature). We found that the following compounds accelerate their polymerization: potassium ferrocyanide, potassium ferricyanide, ammonium ferricyanide, sodium perchlorate, potassium perchlorate, calcium hypochlorite, resorcinol, sodium nitrite, potassium hexafluoroanimonate, dichloro isocyanuric acid, trichlorocyanuric acid, resorcinol, propyl gallate and their mixtures. Some of these compounds require promoter or initiator.

The device can have color filter to filter undesirable color of the device. The device can also have optical effects described in U.S. Pat. No. 7,514,262 which is incorporated herein by reference. One can also add dyes and pigments in the formulation for getting proper color of the device.

A preferred class of diacetylenes have a general formula, R'—C≡C—C≡C—R", where R' and R" are the same or different substituent groups. Though this class of diacetylenes is preferred, other diacetylenes having the following general formulas can also be used: higher acetylenes: R'—(C≡C)$_n$—R", where n=3-5; split di and higher acetylenes: R'—(C≡C)$_m$—Z—(C≡C)$_o$—R", where Z is any diradical, such as —($CH_2$)$_n$— and —$C_6H_4$—, and m and o is 2 or higher; and polymeric di and higher acetylenes: [-A-(C≡C)$_n$—B—]$_x$, where A and B can be the same or different diradical, such as —($CH_2$)$_b$—, —OCONH—($CH_2$)$_b$—NHCOO—, and —OCO($CH_2$)$_b$OCO—. where R' and R" can be the same or different groups.

The preferred diacetylenes include those where R' and R" are selected from: ($CH_2$)$_b$—H; ($CH_2$)$_b$OH; ($CH_2$)$_b$—OCONH—R$^1$; ($CH_2$)$_b$—O—CO—R$^1$; ($CH_2$)$_b$—O—R$^1$; ($CH_2$)$_b$—COOH; ($CH_2$)$_b$—COOM; ($CH_2$)$_b$—$NH_2$; ($CH_2$)$_b$—CONHR$^1$; ($CH_2$)$_b$—CO—O—R$^1$; where b=1-10, preferably 1-4, and R$^1$ is an aliphatic or aromatic radical, e.g. $C_4$-$C_6$ alkyl or phenyl or substituted phenyl, and M is a cation, such as Na$^+$ or (R$^1$)$_3$N$^+$.

The preferred diacetylenes are the derivatives of 2,4-hexadiyne, 2,4-hexadiyn-1,6-diol, 3,5-octadiyn-1,8-diol, 4,6-decadiyn-1,10-diol, 5,7-dodecadiyn-1,12-diol and diacetylenic fatty acids, such as tricosa-10,12-diynoic acid (TC), pentacosa-10,12-diynoic acid (PC), their esters, organic and inorganic salts and cocrystallized mixtures thereof. In a particularly preferred embodiment the diacetylenes are acid, urethane, ester, ether, amine or amide derivatives. The most preferred derivatives of the diacetylenes, e.g. 2,4-hexadiyn-1,6-diol, are the urethane and ester derivatives.

Preferred urethane derivatives are alkyl, aryl, benzyl, methoxy phenyl, alkyl acetoacetate, fluoro phenyl, alkyl phenyl, halo-phenyl, cyclohexyl, toyl and ethoxy phenyl of 2,4-hexadiyn-1,6-diol, 3,5-octadiyn-1,8-diol, 4,6-decadiyn-1,10-diol, 5,7-dodecadiyn-1,12-diol. The prefer urethane derivatives are methyl, ethyl, propyl and butyl derivatives of 2,4-hexadiyn-1,6-diol, 3,5-octadiyn-1,8-diol, 4,6-decadiyn-1,10-diol, 5,7-dodecadiyn-1,12-diol.

The following are some of the preferred derivatives of 2,4-hexadiyn-1,6-diol: urethane (—OCONH—) derivatives, R'CH$_2$—C≡C—C≡C—CH$_2$R', including: hexyl urethane: 166, R'=OCONH(CH$_2$)$_5$CH$_3$; pentyl urethane: 155, R'=OCONH(CH$_2$)$_4$CH$_3$; butyl urethane: 144, R'=OCONH(CH$_2$)$_3$CH$_3$; ethyl urethane: 122, R'=OCONHCH$_2$CH$_3$; methyl urethane: 111, R'=OCONHCH$_3$; ester (—OCO—) derivatives, R'''CH$_2$—C≡C—C≡C—CH$_2$R''', including: butyl ester: 144E, R'''=OCO(CH$_2$)$_3$CH$_3$; ethyl ester: 122E, R'''=OCOCH$_2$CH$_3$; methyl ester: 111E, R'''=OCOCH$_3$; symmetrical diacetylenes including: 156: R'—C≡C—C≡C—R'', where R'=CH$_2$OCONH(CH$_2$)$_5$CH$_3$ and R''=CH$_2$OCONH(CH$_2$)$_4$CH$_3$; cocrystallized mixtures including: containing 80 weight percent or above of 166; 85:15 mixture of 166 and 156; 90:10 mixture of 166 and 156 and 4:1 mixture of tricosadiynoic acid and pentacosadiynoic acid (TP41).

The further preferred diacetylenes are derivatives of 3,5-octadiyn-1,8-urethane, 4,6-decadiyn-1,10-urethane and 5,7-dodecadiyn-1,12-urethane, e.g., hexyl urethane: R'=OCONH(CH$_2$)$_5$CH$_3$; pentyl urethane: R'=OCONH(CH$_2$)$_4$CH$_3$; butyl urethane: R'=OCONH(CH$_2$)$_3$CH$_3$; propyl urethane: R'=OCONH(CH$_2$)$_2$CH$_3$; ethyl urethane: R'=OCONHCH$_2$CH$_3$; methyl urethane: R'=OCONHCH$_3$.

Diacetylenes having esters, paraffins and ethers as R group usually have lower melting point. When a diacetylene is not liquid, its melting point can be decreased by using a solvent or a compound having lower melting point.

Though the size of diacetylene crystals upon freezing is not very critical, preferred size is small from nano to microns. Nucleating agents can help in controlling size of the crystals. Nucleating agents can be added at percentages that promote a desired nucleation/crystallization of diacetylenes. Nucleating agents sizes can range from 1000 microns to 0.001 microns. Preferred nucleating agents are nanoparticles. Preferred nucleating agents are nano and micron sized, metal particles such as that of aluminum and zinc, silver chloride, titanium dioxide and zinc oxide.

Though not required, the liquid diacetylenes can be emulsified just like an oil in water or vice versa.

A preferred solvent for diacetylene should be such that it becomes solid at about 0° C. or at any other desired temperature.

The most preferred are liquid diacetylenes or cocrystallizable and co-polymerizable diacetylenes which become solid at freezing temperature.

Another class of preferred diacetylenes and copolymerizable diacetylenes are those which are water soluble, particularly highly water soluble and having high rate of thermal polymerization even at and below 0° C. Water soluble diacetylenes are preferred because their solution in water will solidify at about 0° C.

Salts and complexes of diacetylenes having acid (e.g., —COOH, SO$_3$H), alcohol (—OH), amide (—NHCO—), amines (e.g., —NH$_3$, —NH$_2$), phenols (-Ph-OH) functionalities and/or their salts are also preferred. Diacetylenic acids can be neutralized with amines and diacetylenic amines neutralized with acids can be used, preferred are relatively short chain diacetylenes. Neutralization can be partial or full and can be co-crystallized.

A large number of diacetylenes can be used for the instant applications. Many of them are reported by Ribi in U.S. Pat. Nos. 5,918,981; 6,046,455; 6,787,108; 7,204,199; 7,514,262; 7,597,844; 7,776,371; 7,813,025 and U.S. patent application #20090305927, 20100012018, 20100029004, 20100247223, 20100322874, 20100326198, and 20110008498 which are all incorporated herein by reference. Some specific examples include ester of 5,7-dodecadiynoic acid, 5,7-tetradecadiynoic acid, 5,7-hexadecadiynoic acid, 5,7-octadecadiynoic acid, 5,7-dodecadiynoic acid, 10,12-octadecadiynoic acid, 10,12-heneicosadiynoic acid and 10,12-pentacosadiynoic acid.

Other diacetylenes that can be used as freeze indicator, either with a solvent or upon cocrystallization are listed by Patel in U.S. Pat. No. 7,476,874 which is incorporated herein by reference.

A number of patents have been issued on the use of diacetylenes for applications, such as time temperature indicators for monitoring thermal degradation of perishables, thermochromic materials, recording media, and in radiation dosimeters. Some representative patents on radiation dosimetry and imaging applications using diacetylenes are: U.S. Pat. Nos. 4,412,898; 4,668,598; 4,684,688; 4,705,741; 4,954,428; 4,954,543; 5,139,928; 5,359,200; and 5,420,000. Some representative patents on the use of diacetylenes in time-temperature indicators are: U.S. Pat. Nos. 3,501,302; 3,679,738; 3,723,121; 3,743,505; 3,772,011; 3,772,028; 3,811,895; 3,999,946; 4,066,676; 4,384,980; 4,734,355; 4,784,934, and 4,954,543 which are all incorporated by reference.

A large number of partially polymerized diacetylenes which undergo an irreversible color change when contacted with a catalyst can be used for making the device. Some typical examples of color change of partially polymerized diacetylenes (PPDs) with solvents are described in a publication by Patel, see J. Macromol. Sci. Phys, B20, 111 (1981). PPDs having the side chain —(CH$_2$)$_4$OCONHR$^1$, wherein R$^1$ is described elsewhere herein, usually change from blue-to-red when contacted with a solvent such as acetone. Certain PPDs, such as that of "166" (R=CH$_2$OCONH(CH$_2$)$_6$H] change from red-to-blue (U.S. Pat. No. 5,420,000) when melted or contacted with a solvent. Preferred partially polymerized diacetylenes are those which have high solubility in common, nontoxic, and high boiling solvents at low temperatures. Esters of diacetylene (R=(CH$_2$)$_n$—CO—O—R$^1$ or (CH$_2$)$_n$—O—CO—R$^1$) are a preferred class of indicators as they usually have high solubility in common solvents. Other diacetylenes having functionality, such as alkyl, acid, alcohol, urethanes and amides can also be used. The speed of the color change will depend upon parameters, such as solubility and particle size of diacetylene, solvent/activator strength, temperature, nature of co-solvent/additive, binder, and nature of the functionality of the diacetylene.

Also preferred are diacetylenes which can be emulsified in water with or without an emulsifying agent.

A pair of diacetylene and binder which forms a gel is preferred. Use of polymeric binder will depend upon the nature of the diacetylene, catalyst and additives. For water soluble diacetylenes, the preferred binders are water soluble such as polyacrylic acid, polyvinyl pyrrolidone, polyacrylamide, starch, gelatin and natural polymers and gums, such as guar gum and agar. For diacetylenes which are soluble in organic solvents, polymers which are soluble in organic solvents, such as polyvinyl acetate, polystyrene, cellulose acetate and polybutyral can be used.

Additives or solvents useful in the invention device include C$_1$-C$_{15}$ aliphatic, aromatic and substituted aliphatic and aromatic amides preferably acetamide, dimethylformamide and chloroacetamide; alcohols, preferably amyl alcohol, hexyl alcohol, and dichloropropanol; esters, preferably methylpropionate, amylformate, diethyl maleate, ethylene glycol diacetate, ethylsalicylate, and triacetin; nitroalkanes preferably nitropropane; aldehydes, preferably butyraldehyde; carbonates, preferably diethylcarbonate and propylene carbonate; aromatic alcohols/phenols, preferably dihydroxy benzene, benzyl alcohol and phenol; amines, preferably diethanolamine, dimethylpyridine and cyclohexane diamine; ether-esters preferably ethoxyethylacetate, trioxane, tetraethylene glycol dimethylether, benzyl ether, phenylether, propylene glycol ethylether acetate and propylene glycol butylether; alcohol-esters, preferably ethylene glycol monacetate; acids, preferably glutaric acid, isobutyric acid, mandelic acid, and toluene sulfonic acid; ketones, preferably methylethylketone and hydroxyacetophenone; ketone-esters, preferably methylacetoacetate; lactones, preferably propiolactone and butyrolactone and methylpyrrolidone.

Preferred solvents are those which dissolve diacetylenes above a predetermined temperature and crystallize below the predetermined temperature. The most preferred solvents are those which dissolve diacetylenes and crystallize only when the solvent becomes solid and does not form a solid solution with diacetylenes. If a diacetylene crystallizes before the pre-determined temperature, there will be pre-matured crystallization and pre-mature indication of freezing.

The following are some examples of compounds that can be used to change the crystallization/melting point of the device: 1,2,3,5-tetramethylbenzene (isodurene); 1,2,3-trimethyl benzene or hemimellitene; 1-bromonaphthalene; 2-hydroxy acetophenone; 2-undecanone; 4-methyl quinolone; acetonaphthalene; benzene; benzyl laurate; benzyl myristate; benzyl palmitate; butyl myristate; butyl stearate; butyrophenone; cetyl palmitate; citraconic anhydride; cycloheptane; decyl alcohol; decyl caprate; decyl myristate; decyl stearate; decyl decanoate; diethyl phthalate; diethyl succinate; dimethyl adipate; dimethyl phthalate; dimethyl succinate; diphenyl-methane; dodecane; eicosane; ethyl anisate; ethyl anthranilate; ethyl cinnamate; ethyl myristate; ethyl stearate; ethylene dibromide; heptyl caprylate; hexadecane; hexyl laurate; isopropyl myristate; isopropyl palmitate; lauric acid; lauryl caprate; auryl palmitate; methyl laurate; methyl myristate; methyl palmitate; methyl stearate; myristic acid; nananoic acid; n-dodecane; neopentane; n-heptadecane; n-heptadecene-1; n-hexadecane; n-hexadecene-1; n-octadecane; n-octadecene-1; n-pentadecane; n-pentadencene; n-tetradecane; n-tetradecane-1; n-tridecane; o-chlorobenzaldehyde; octadecyl acetate; octyl caprate; octyl caprylate; o-xylene; palmitic acid; phenyl cyclohexane; p-xylene; tetralin or tetrahydronaphthalene; triacontane or undecane.

One advantage offered by the present invention is the ability to modify the temperature at which the device will change color by addition of neutral additives for increasing or decreasing the freezing/thawing temperature. For example, sodium chloride, calcium chloride, organic salts, such as ammonium citrate can depress the freezing point down to −10° C. Similarly, the addition of ethylene glycol can depress the freezing temperature of water down to −30° C. By the proper use and selection of the salt or water soluble organic compounds, such as glycols, and weight percentage in solution, the predetermined temperature can be desirably altered and adjusted.

Jelly and very viscous formulation is preferred so it can be easily coated, printed and/or sandwiched between two plastic films. Though not required but preferred are binders which also become solid or precipitate when the other additives and diacetylenes become solid. Polymeric binders can provide very viscous or solid jelly like formulations.

The formulation and devices can also be used as a thaw indicators as one does not need the UV light for polymerization of diacetylenes for development of the blue or red color. The freeze indicators proposed here are self-activating thaw indicators as well.

UV absorbers can be added or UV absorbing film or coating can be used to minimize the effect of UV light if required. Preferred polymers are aromatic polymers, such as PET (polyethylene terephthalate) and polyimide.

In order to make the self-reading devices, the formulations can be printed using a wide range of conventional and innovative printing mechanisms which are not limited herein. Printing can be accomplished using high-speed methods, such as flexographic printing, rotogravure, off-set printing and the like. Printing can also be accomplished using medium speed processes, such as screen printing, rotary screen printing, and fluid application. Printing can also be accomplished using ink jet printing, drop on demand printing, continuous ink jet printing, valve jet printing, spray coating, dropping methods, flood coating methods, dip coating methods, metering methods and other fluid application systems and the like. The exact printing method utilized will depend on the type of printing required, formulations utilized, device configurations, volume requirements and the like.

In order to make a fine dispersion of indicator in the activator system, it is preferred to use an emulsifying agent, such as a wetter/surfactant. A large number of surfactants are available commercially including: polyoxyethylene alkyl phenols, polyoxyethylene esters, polyoxypropylene esters, salts of fatty long chain acids and sulfonates, polyethylene oxides, polypropylene oxides, 2-octylphenol and ammonium laurate.

A variety of polymers can be used as a binder for the indicating system. Use of polymer/binder will depend upon the nature of the indicating formulation and its components. If the formulation is water soluble, one needs water soluble polymers and vice versa. Polymers, such as hydroxypropyl cellulose, hydroxypropyl methyl cellulose, starch, colloidal silicon dioxide, polyethylene glycol, polydimethylsiloxane and various synthetic polymers can be used as binders for the devices.

Although the use of a binder is not necessary, it is desirable to use a binder to minimize the flow of the components. Any polymeric material which forms a three dimensional network can be used. Both gel forming and non-gel forming materials, such as polymers, can be used as binders. Higher molecular weight binders are preferred. Materials which form a gel in the activator system at room temperature are the most preferred binders. Polymers which are crosslinked or can be crosslinked can also be used. They include natural and synthetic polymers, such as gelatin, agar, agarose, "Super Slurper", which is a 60% graft copolymer of starch, polyacrylamide, acrylic acid and sodium salts. One can use a variety of polymers, copolymers and their mixtures as binders to get desired properties, such as high gel strength and high gelling temperature. Liquid absorbants such as cellulose in form of powder, paper, cotton or fabric can also be used as binder.

Inorganic gelling materials can also be used as binders. A wide variety of sol-gel type materials are reported in the literature. In gel form, these materials can also be used as binders.

Water soluble polymers and gums, such as alginates, alkyl and hydroxyalkylcellulose, carboxymethylcellulose, carrageenan, guar gum, gum agar, gum gatti, gum karay, gum tragacanth, locust bean gum, pectins, polyacrylamide, polyacrylic acid, polyethylene glycols, polyvinylpyrrolidone, starch and its modified forms, tamarind gum, xanthan gum, gelatins, and polyethyleneimine, their copolymers including graft copolymers and their mixtures, can be used as binders. Water insoluble polymers which form a gel in a combination of solvent and nonsolvent for the diacetylene can also be used for this device. Such polymers are listed in "Polymer Handbook" by A. Hiltner, Third Edison (J. Brandrup and E. H. Immergut Eds), John Wiley and Sons, New York, N.Y. 1989.

Reversible gel forming polymers listed in the following books and reviews can also be used (1) "Reversible Polymeric Gels and Related Systems", Paul S. Russo, ACS Symposium Series #350, Washington, D.C., 1987; (2) L. L. Hench and J. K. West, Chem. Rev., 90, 33 (1990); (3) "Hydrogels" reported by Nagasaki and K. Kataoka, in Chemtech, p23 Mar. 1997; E&E News, Jun. 9, 1997 p26, Encyclopedia of Polymer Science Technology, 7, 783 (1986); and (4) "Reversible Crosslinking", Encyclopedia of Polymer Science Technology, 4, 395, (1986), L. Z. Rogogovina and G. L. Slonimiski, and Russian Chemical Review, 43, 503 (1974).

Examples of barrier films which can be used are polymer films, which are highly resistant to permeation of the solvents are further preferred materials for the container for the freeze indicating formulation. They include, coated and laminated films made from natural and synthetic polymers, copolymers, graft copolymer and their blends, such as polyolefins (polyethylene, polypropylene, and polybutylene), nylons, polyesters (polyvinylacetate and polyethylene terephthalate), polyvinyls (polyvinylchloride, polyvinylidene chloride), polyacrylates, polycarbonates, ionic polymers, cellulose acetate, and regenerated cellulose. Preferred is Saran wrap which is a multilaminated layer of polyvinylidene chloride, polyester and polyethylene. Preferred material is polyester coated with aluminum oxide.

The base film can be transparent or opaque. One can use metal foil, such as aluminum or metallized plastic film, such as with the microcup configuration.

The basic requirements for the top transparent film of the devices are: transparency, to visually witness the color change; and impermeability, to prevent the solvents from diffusing out. The window film may optionally have a scratch resistant top coat, such as polyurethane, polystyrene, epoxy or polyester. Preferred film is coated and laminated polyester. Also, the window coat can contain a UV absorber, such as hydroxybenzoic acid, benzoic acid and aromatic organic compounds.

The device can be made by using any conventional methods such as coating the formulation on a substrate, injecting the formulation into a plastic film compartment, sealing a slice of the gelled formulation and by microencapsulation. Coating of diacetylene liquid mixture can be carried out by using any conventional coating method. Also, the formulation can be injected into pre-made compartments, such as bulbs or microcups, followed by making each pouch of uniform thickness.

Preferred is the use of a fine dispersion of a diacetylene dispersed throughout the gel. The diacetylene can be made by any of the methods described in U.S. Pat. No. 5,420,000 hereby incorporated by reference for this particular purpose. If the binder is a gel forming material, it will form a gel when cooled to room temperature. The formulation can be made by homogenizing a mixture of a diacetylenes, catalyst, co-catalyst, activator, surfactant, binder and a solvent at a high temperature followed by cooling to a lower temperature, such as room temperature.

Thermochromic materials which change color upon heating, including those changing color upon melting, are used to make thermal paper. Thermochromic material can be used for indicating higher temperature. A mixture of a leuco dye, developer and sensitizer is often used for making irreversible thermochromic indicators. Some examples are given below:

Examples of leuco dyes that can be used herein are described as follows: (a) leuco bases of triphenylmethane dyes, such as 3,3-bis(p-dimethylaminophenyl)-phthalide, 3,3-bis(p-dimethylaminophenyl)-6-dimethylaminophthalide (Crystal Violet Lactone), 3,3-bis(p-dimethylaminophenyl)-6-diethylaminophthalide, 3,3-bis(p-dimethylaminophenyl)-6-chlorophthalide, and 3,3-bis(p-dibutylaminophenyl)-phthalide; (b) leuco bases of fluoran dyes, such as 3-cyclohexylamino-6-chlorofluoran, 3-(N—N-diethylamino)-5-methyl-7-(N,N-Dibenzylamino)fluoran, 3-dimethylamino-5,7-dimethylfluoran and 3-diethylamino-7-methylfluoran; (c) miscellaneous fluoran dyes, such as 3-diethylamino-6-methyl-7-chlorofluoran, 3-pyrrolidino-6-methyl-7-anilinofluoran, and 2-[3,6-bis(diethylamino)-9-(0-chloroanilino)xanthybenzoic acid lactam]; and (d) lactone compounds, such as 3-(2'-hydroxy-4'-dimethylaminophenyl)-3-(2'[-methoxy-5'-chlorophenyl)phthalide, 3-(2'-hydroxy-4'-dimethylaminophenyl)-3-(2'methoxy-5'-nitrophenyl-phthalide, 3-(2'-hydroxy-4'-diethylaminophenyl)-3-(2'methoxy-5-methylphenyl)phthalide and 3-(2'-methoxy-4'-dietnethylaminophenyl)-3-(2'-hydroxy-4'-chloro-5'-methylphenyl)-phthalide.

Examples of suitable developers are phenol compounds, organic acids or metal salts thereof and hydroxybenzoic acid esters Examples of phenol compounds include 4,4'-isopropylene-diphenol (bisphenol A), p-tert-butylphenol, 2-4-dinitrophenol, 3,4-dichlorophenol, p-phenylphenol, 4,4-cyclohexylidenediphenol. Useful examples of organic acid and metal salts thereof include 3-tert-butylsalicylic acid, 3,5-tert-butysalicylic acid, 5-a-methylbenzylsalicylic acid and salts thereof of zinc, lead, aluminum, magnesium or nickel.

Sensitizers or thermosensitivity promoter agents are used in the recording materials of the present invention to give a good color density to the images obtained. Some of the common sensitizers which are suitable are fatty acid amide compounds, such as acetamide, stearic acid amide, linolenic acid amide, lauric acid amide, myristic acid amide, methylol compounds or the above mentioned fatty acid amides, such as methylenebis (stearamide), and ethylenebis (stearamide), and compounds of p-hydroxybenzoic acid esters, such as methyl p-hydroxybenzoate, n-propyl p-hydroxybenzoate, isopropyl p-hydroxybenzoate, benzyl p-hydroxybenzoate.

The encapsulated material may contain color former, color developer, sensitizer and a color or white pigment as normally found in direct thermal papers and films. A proper mixture of above chemicals, especially formualtions undergoing colorless to color, can be used as thermochromic material for indicating higher temperature indicator as exemplified in Figures related to high temperature indicator.

The size of the device can vary from a few square millimeters to tens of centimeters. The thickness of the device can vary from 0.1 mm to a centimeter or larger.

The shape of the device could be any shape, such as circular, square, rectangular and cylinder.

The concentration of diacetylene(s) in the freeze indicating formulations can be from 1 to 90 wt %. The preferred concentration is between 10 and 50 wt %. The most preferred concentration is about 25-35 wt % with about 30 wt % being most preferred.

The diacetylene can be at least two co-crystallizing diacetylenes. The weight ratio of two co-crystallizing diacetylenes for the freeze indicating formulations can be from 1 to 99. More preferably is a weight ratio of 10 to 60 and even more preferably about 15 to 25 with about 20 being most preferred.

The concentration of the catalysts or their precursors in the freeze indicating formulations can be from 0.1 to 30%. The preferred concentration is between 1 and 10%. The most preferred concentration is about 5%.

The concentration of nucleating agent in the freeze indicating formulations can be from 0.1 to 5 wt %. More preferably the concentration is between 0.5 and 2 wt % and even more preferably about 3-7 wt % with about 0.8 to 1.2 wt % being more preferred and about 1 wt % being most preferred.

The concentration of solvents including solvents for binder, diacetylene and those having freezing point around 0° C. for the freeze indicating formulations can be from 5 to 90 wt %. More preferably the freeze indicating solution has at 20 to no more than 80 wt % and even more preferably 40 to 60 wt % solvent. Most preferably the freeze indicating solution has about 50 wt % solvent.

The concentration of polymeric binder for the freeze indicating formulations can be from 1 to 90 wt %. More preferably the concentration is between 20 and 60 wt % and even more preferably between 30 and 50 wt % with about 40 wt % being most preferred.

The temperature range for development of a color or color change upon freezing or solidification of the freeze indicating formulations is from minus 40° C. to 100° C. The preferred temperature range is between minus 20° C. to 25° C. The most preferred temperature is 0° C.

The time range required for freeze indicating formulation to develop a noticeable color or color change is from 1 second to 1 day. The preferred time is between 1 minute to 1 hour. The most preferred time is a few minutes.

Parameters, such as time and temperature for the color development of the freeze indicating devices can be varied by varying the nature and concentration of one or more of the catalysts and/or their precursors; the additives; the solvents; the diacetylenes and/or co-crystallized diacetylenes or the polymeric binder as set forth elsewhere herein.

The indicator devices disclosed herein offers the following major advantages over the corresponding devices reported in the literature. The indicator undergoes colorless-to-color change and hence become self-reading indicator. The indicator can be printed in form of a message. The indicator is a self-activating and self-reading indicator. The indicator is a thin device. The indicator has a long shelf-life. The indicator is a less expensive and accurate device than previously available. The rate of reaction is based on polymerization of diacetylenes, and hence the time required for the color development can be controlled by selecting proper diacetylenes, catalysts, precursors for the catalysts and their concentrations. The temperature for the color development can be varied from high temperature to a very low temperature, such as minus 40° C., by adding proper solvents. The indicator can be combined with other indicators such as time-temperature and temperature indicators. The indicator is also a thaw indicator. The indicator is also a refreeze indicator. The indicator is a thaw indicator, is self-activating and can have a long shelf-life. The indicator can monitor freezing and thawing.

The following Examples are illustrative of carrying out the invention and should not be construed as being limits on the scope and spirit of the instant invention.

EXAMPLES

Example 1 was prepared as a coating of methyl-10, 12-tricosadiyanoate (TCME) which has a melting point of 18° C. Example 1 did not develop a noticeable blue color for one day at −5° C.

Example 2 was prepared as Example 1 with a mixture of 0.5 g TCME and 1 g of palmitic acid. Example 2 did not develop a noticeable blue color for one day at −5° C.

Example 3 was prepared as Example 1 with a mixture of 0.5 g TCME and 1 g of polydimethylsiloxane. Example 3 did not develop a noticeable blue color for one day at −5° C.

Example 4 was prepared as Example 1 with a mixture of 0.5 g TCME, 1 g of palmitic acid and 1 g of polydimethylsiloxane. Example 4 did not develop a noticeable blue color for one day at −5° C.

Example 5 was prepared as Example 1 with a mixture of 0.5 g TCME and 1 g of finely ground sodium nitrite. Example 5 developed a light blue color after a day at −5° C.

Example 6 was prepared as Example 1 with a mixture of 0.5 g TCME, 1 g finely grinded sodium nitrite, 0.1 g water and 1 g of palmitic acid heated to about 70° C. and cooled to RT developed noticeable light blue color within minutes at −5° C.

Example 7 was prepared as Example 1 with mixture of 0.5 g TCME, 1 g finely grinded sodium nitrite, 0.1 g water, 1 g of palmitic acid and 1 g of polydimethylsiloxane, heated to about 70° C., and cooled to room temperature (RT). Example 7 developed a light blue color within minutes at −5° C.

Example 8 was prepared by printing the formulation of Example 7 in the form of the word "FROZEN" on a filter paper and placing the sample in a polyester bag which was subsequently sealed. The word "FROZEN" was barely noticeable as a faint yellow color. When placed in a freezer at −5° C., the word FROZEN changed to a light blue color within five minutes. The blue color intensified with time. When brought out of the freezer, the word FROZEN changed to a light red color. When placed back in the freezer, it started turning purple after about 15 minutes.

The invention has been described with particular reference to the preferred embodiments without limit thereto. One of skill in the art would realize additional embodiments and improvements which are not specifically recited but which are within the scope of the invention as set forth in the claims appended hereto.

The invention claimed is:

1. A freeze indicator comprising:
   a substrate;
   a freeze indicator composition on said substrate wherein said freeze indicator comprises:
   a liquid or solution of a diacetylene;
   a catalyst or catalyst precursor capable of polymerizing said diacetylene when it crystallizes from its solution or liquid state when cooled to a lower temperature;
   and a protective barrier.

2. The freeze indicator of claim 1 wherein said freeze indicator composition is a self-activating freeze indicator.

3. The freeze indicator of claim 1 wherein said freeze indicator composition comprises 1-99 wt % of said liquid or solution of diacetylene.

4. The freeze indicator of claim 1 wherein said liquid or solution of a diacetylene comprises at least two co-crystallizable diacetylenes.

5. The freeze indicator of claim 4 wherein said at least two co-crystallizable diacetylenes are in a weight ratio of 1 to 99.

6. The freeze indicator of claim 1 wherein said catalyst comprises a second liquid or solution of a diacetylene.

7. The freeze indicator of claim 6 wherein said second liquid or solution of a diacetylene and said liquid or solution of a diacetylene co-crystallizes upon freezing.

8. The freeze indicator of claim 7 wherein said liquid or solution of a diacetylene and said second liquid or solution of a diacetylene are in a weight ratio of 1 to 99.

9. The freeze indicator of claim 1 wherein said diacetylene is R'—C≡C—C≡C—R",
where R' and R" are independently selected from: $(CH_2)_b$—H; $(CH_2)_b$OH; $(CH_2)_b$—OCONH—$R^1$; $(CH_2)_b$—O—CO—$R^1$; $(CH_2)_b$—O—$R^1$; $(CH_2)_b$—COOH; $(CH_2)_b$—COOM; $(CH_2)_b$—$NH_2$; $(CH_2)_b$—CONH$R^1$; $(CH_2)_b$—CO—O—$R^1$ or a mixture thereof; where b=1-10, and $R^1$ is an aliphatic or aromatic radical, and M is a cation or $(R^1)_3N^+$.

10. The freeze indicator of claim 9 wherein said $R^1$ is a C1-C15 alkyl.

11. The freeze indicator of claim 1 wherein said diacetylene is symmetrical or asymmetrical fatty acid of $R^1$—(CH2)n-C≡C—C≡C—(CH2)m—$R^2$ or their derivatives, where and $R^1$ and $R^2$ are an aliphatic radical an aromatic radical or —COOH and at least one of the $R^1$ or $R^2$ is —COOH and n and m are independently selected from 1-10.

12. The freeze indicator of claim 11 wherein said fatty chain diacetylene is selected from tricosa-10,12-diynoic acid and pentacosa-10,12-diynoic acid.

13. The freeze indicator of claim 12 wherein said fatty chain diacetylene is an ester, an amide, an organic salt or an inorganic salt of tricosa-10,12-diynoic acid or an ester, an amide, an organic salt or an inorganic salt of pentacosa-10,12-diynoic acid.

14. The freeze indicator of claim 1 wherein said diacetylene is selected from 1,10-dichloro-4,6-decadiyne and methyl-10, 12-tricosadiynoate.

15. The freeze indicator of claim 1 wherein said freeze indicator composition comprises 0.1-30 wt % of said catalyst or catalyst precursor.

16. The freeze indicator of claim 1 wherein said catalyst or catalyst precursor is an oxidizing agent.

17. The freeze indicator of claim 1 wherein said catalyst is selected from the group consisting of inorganic peroxides, nitric acids, nitrates, nitrites, chlorites, chlorates, perchlorates, hypochlorites, ozone, nitrous oxide, silver oxide, permanganate salts, hexavalent chromium compounds, persulfuric acids, sulfoxides, sulfuric acids, Tollens' reagent, 2,2'-dipyridyldisulfide, osmium tetroxide, ozonides, nitrogen oxides, nitrogen oxide acids, salts of nitrogen oxide acids, nitroglycerine, carbene compounds, chlorine dioxide, nitrosyl sulfuric acid, nitrosonium tetrafluoroborate, nitrosonium hexafluorophosphate, nitrosonium hexachloroantimonate, nitrosonium halides, nitro sonium nitrate, nitrosonium phosphate, nitrosonium carboxylates, nitrosonium perchlorate, NOPF6, NOPF, metal nitrosyls, nitrosyl halides, nitrosyl acetate, nitrosyl sulfate, nitrosyl sulfuric anhydride, organic nitrites, halogens, aldehydes, diaminesilver(1) hydroxide, organo metallic catalysts, carboxylic acids, potassium ferrocyanide, potassium ferricyanide, ammonium ferricyanide, sodium perchlorate, potassium perchlorate, calcium hypochlorite, resorcinol, sodium nitrite, potassium hexafluroanimonate, dichloro isocyanuric acid, trichlorocyanuric acid, resorcinol, propyl gallate, hydrogen peroxide, chromic and dichromic acids and chromium trioxide, pyridinium chlorochromate, and chromate/dichromate compounds, nitrous oxide, nitric oxide, nitrogen dioxide,nitrous acid and nitric acid, nitrite, nitroglycerine, butyl nitrite, isobutyl nitrite, ethyl nitrite, methyl nitrite, isopropyl nitrite and cyclohexyl nitrite, chlorine, n-butyllithium, phenyl lithium, acetic acid, lauric acid, palmitic acid, benzoic acid, and catechol.

18. The freeze indicator of claim 1 wherein said freeze indicator composition further comprises a nucleating agent.

19. The freeze indicator of claim 17 wherein said freeze indicator composition comprises 0.1 to 5 wt % of said catalyst.

20. The freeze indicator of claim 18 wherein said nucleating agent has a size range of from 0.001 microns to 1000 microns.

21. The freeze indicator of claim 18 wherein said nucleating agent is selected from the group consisting of nano and micron sized aluminum, zinc, silver chloride, titanium dioxide and zinc oxide.

22. The freeze indicator of claim 1 wherein said freeze indicator composition further comprises a solvent.

23. The freeze indicator of claim 22 wherein said freeze indicator composition comprises 5-90 wt % of said solvent.

24. The freeze indicator of claim 22 wherein said solvent is selected from the group consisting of C1-C1s aliphatic amides, C1-C1s aromatic amides, alcohols, esters, nitroalkanes, aldehydes, carbonates, aromatic alcohols, amines, ether-esters, alcohol-esters, acids, ketones, ketone-esters, lactones and methylpyrrolidone.

25. The freeze indicator of claim 24 wherein said solvent is selected from the group consisting of 1,2,3,5-tetramethylbenzene (isodurene), 1,2,3-trimethyl benzene, 1-bromonaphthalene, 2-hydroxy acetophenone, 2-undecanone, 4-methyl quinolone, acetonaphthalene, benzene, benzyllaurate, benzyl myristate, benzyl palmitate, butyl myristate, butyl stearate, butyrophenone, cetyl palmitate, citraconic anhydride; cycloheptane, decyl alcohol, decyl caprate, decyl myristate, decyl stearate, decyl decanoate, diethyl phthalate, diethyl succinate, dimethyl adipate, dimethyl phthalate, dimethyl succinate, diphenyl-methane, dodecane, eicosane, ethyl anisate, ethyl anthranilate, ethyl cinnamate, ethyl myristate, ethyl stearate, ethylene dibromide, heptyl caprylate, hexadecane, hexyllaurate, isopropyl myristate, isopropyl palmitate, lauric acid, lauryl caprate, auryl palmitate, methyllaurate, methyl myristate, methyl palmitate, methyl stearate, myristic acid, nananoic acid, n-dodecane, neopentane, n-heptadecane, n-heptadecene-1,n-hexadecane,n-hexadecene-1,n-octadecane, n-octadecene-1, n-pentadecane, n-pentadencene, n-tetradecane, n-tetradecane-1, n-tridecane, o-chloro-benzaldehyde, octadecyl acetate; octyl caprate; octyl caprylate; o-xylene; palmitic acid; phenyl cyclohexane; p-xylene; tetralin or tetrahydronaphthalene; triacontane or undecane.

26. The freeze indicator of claim 1 wherein said freeze indicator composition further comprises a binder.

27. The freeze indicator of claim 26 wherein said freeze indicator composition comprises 0-90 wt % of said binder.

28. The freeze indicator of claim 26 wherein said binder comprises a material selected from the group consisting of alginates, hydroxyalkylcellulose, carboxymethylcellulose, carrageenan, guar gum, gum agar, gum gatti, gum karay, gum tragacanth, locust bean gum, pectins, polyacrylamide, polyacrylic acid, polyethylene glycols, polyvinylpyrrolidone, tamarind gum, xanthan gum, gelatin, cellulose and polyethyleneimine.

29. The freeze indicator of claim 1 wherein said substrate is selected from coated film and laminated film.

30. The freeze indicator of claim 29 wherein said laminated film comprises layers of polyvinylidene chloride, polyester and polyethylene.

31. The freeze indicator of claim 29 wherein said coated film is polyester coated with aluminum oxide.

32. The freeze indicator of claim 1 wherein said substrate is transparent.

33. The freeze indicator of claim 1 wherein said indicating composition is in the form of a printed symbol or message on said substrate.

34. The freeze indicator of claim 1 wherein said indicating composition is sealed between said substrate and a protective film.

35. The freeze indicator of claim 34 wherein said substrate comprises natural polymers, synthetic polymers, copolymers, graft copolymer, nylons, polyesters, polyacrylates, polycarbonates, ionic polymers, cellulose acetate, and regenerated cellulose and their blends.

36. The freeze indicator of claim 1 wherein said freeze indicating solution changes color within a temperature range of from −40° C. to 100° C.

37. The freeze indicator of claim 36 wherein said freeze indicating solution changes color within a temperature range −20° C. to 25° C.

38. The freeze indicator of claim 36 wherein said freeze indicating solution changes color within a time range of from 1 second to 1 day.

39. The freeze indicator of claim 38 wherein said freeze indicating solution changes color within a time range of from 1 minute to 1 hour.

* * * * *